(12) United States Patent
Saenz De Ugarte Sevilla

(10) Patent No.: US 12,571,374 B2
(45) Date of Patent: Mar. 10, 2026

(54) GEARBOX FOR A WIND TURBINE

(71) Applicant: Siemens Gamesa Renewable Energy Innovation & Technology, S.L., Sarriguren (ES)

(72) Inventor: Patrik Saenz De Ugarte Sevilla, Leioa (ES)

(73) Assignee: SIEMENS GAMESA RENEWABLE ENERGY INNOVATION & TECHNOLOGY, S.L., Sarriguren (ES)

( * ) Notice: Subject to any disclaimer, the term of this patent is extended or adjusted under 35 U.S.C. 154(b) by 0 days.

(21) Appl. No.: 18/855,657

(22) PCT Filed: Mar. 17, 2023

(86) PCT No.: PCT/EP2023/056911
§ 371 (c)(1),
(2) Date: Oct. 10, 2024

(87) PCT Pub. No.: WO2023/202821
PCT Pub. Date: Oct. 26, 2023

(65) Prior Publication Data
US 2025/0230798 A1       Jul. 17, 2025

(30) Foreign Application Priority Data

Apr. 22, 2022    (EP) .................................... 22382378

(51) Int. Cl.
*F03D 15/10* (2016.01)
*F03D 80/70* (2016.01)
*F16C 19/38* (2006.01)

(52) U.S. Cl.
CPC ........... *F03D 15/10* (2016.05); *F03D 80/703* (2023.08); *F16C 19/386* (2013.01);
(Continued)

(58) Field of Classification Search
CPC .. F03D 15/00; F16C 2360/31; F16C 2361/61; F16C 19/38; F16H 57/021; F16H 1/06; F16H 2057/02078
See application file for complete search history.

(56) References Cited

U.S. PATENT DOCUMENTS 4,964,315 A * 10/1990 Willis, Jr. ................. F16H 1/22
74/665 K
5,802,837 A * 9/1998 Paweletz ................. F16C 19/18
57/406
(Continued)

FOREIGN PATENT DOCUMENTS

| CN | 101 881 319 A | 11/2010 |
| CN | 202 360 732 U | 8/2012 |

(Continued)

OTHER PUBLICATIONS

"Wind turbines—Part 4: Design requirements for wind turbine gearboxes", IEC 61400-4:2012, IEC, 3, Rue De Varembe, Po Box 131, CH-1211 Geneva 20, Switzerland, Dec. 4, 2012 (Dec. 4, 2012).
(Continued)

*Primary Examiner* — Jake Cook
(74) *Attorney, Agent, or Firm* — Schmeiser, Olsen & Watts LLP

(57) ABSTRACT

A transmission assembly for coupling a forerunning gearbox stage to a generator of a wind turbine is provided, the transmission assembly including an intermediate speed shaft supported by an intermediate speed shaft bearing arrangement and including an intermediate speed shaft gear, a high-speed shaft supported by a high-speed shaft bearing arrangement and including a high-speed shaft gear, and a gear mesh formed by an engagement of the intermediate speed shaft gear and the high-speed shaft gear, wherein the
(Continued)

gear mesh is configured to transfer a torque between the intermediate speed shaft and the high-speed shaft.

13 Claims, 8 Drawing Sheets

(52) U.S. Cl.
CPC ... *F05B 2240/50* (2013.01); *F05B 2260/4031* (2013.01); *F16C 2360/31* (2013.01)

(56) References Cited

U.S. PATENT DOCUMENTS

| | | | | |
|---|---|---|---|---|
| 7,614,976 B2 * | 11/2009 | Smook | .................... | F03D 15/00 |
| | | | | 475/331 |
| 8,529,397 B2 * | 9/2013 | Demtroder | ................ | F16H 1/28 |
| | | | | 475/331 |
| 10,927,941 B2 | 2/2021 | Leimann | | |
| 11,041,542 B2 * | 6/2021 | Hamajima | .......... | F16H 57/0018 |
| 2011/0037269 A1 * | 2/2011 | Poon | ....................... | F16C 35/04 |
| | | | | 290/55 |
| 2013/0001952 A1 | 1/2013 | Paweletz et al. | | |
| 2018/0245571 A1 * | 8/2018 | Adler | .................. | F15B 15/1428 |

FOREIGN PATENT DOCUMENTS

| | | | | |
|---|---|---|---|---|
| CN | 111520444 A * | 8/2020 | ........... | F16H 57/023 |
| DE | 10 2009 059671 A1 | 6/2011 | | |
| EP | 3084267 B1 | 8/2018 | | |
| WO | 2015/090791 A1 | 6/2015 | | |
| WO | 2022015791 A1 | 1/2022 | | |

OTHER PUBLICATIONS

International Search Report & Written Opinion for PCT/EP2023/056911 mailed Jun. 19, 2023.
European Search Report mailed Oct. 21, 2022 corresponding to EP Application No. 22382378.2 filed Apr. 22, 2022.

* cited by examiner

FIG 8

GEARBOX FOR A WIND TURBINE

CROSS-REFERENCE TO RELATED APPLICATIONS

This application is a national stage of PCT Application No. PCT/EP2023/056911, having a filing date of Mar. 17, 2023, which claims priority to EP application Ser. No. 22/382,378.2, having a filing date of Apr. 22, 2022, the entire contents both of which are hereby incorporated by reference.

FIELD OF TECHNOLOGY

The following relates to a transmission assembly for coupling a forerunning gearbox stage to a generator of a wind turbine. The following further relates to a gearbox for a wind turbine comprising the transmission assembly. The following further relates to a drive train of a wind turbine comprising the gearbox. The following further relates to a wind turbine comprising the drive train.

BACKGROUND

Wind turbines are increasingly used for the generation of electrical energy. A wind turbine comprises a tower and a nacelle mounted on the tower, to which a hub is attached. A rotor is mounted at the hub and coupled to a generator. A plurality of blades extends from the rotor. The blades are oriented in such a way that wind passing over the blades turns the rotor, thereby driving the generator. Hence, the rotational energy of the blades is transferred to the generator, which then converts the mechanical energy into electricity and transfers the electricity to the electrical grid.

A main drive shaft in the nacelle connects the rotor of the wind turbine to a gearbox, which in turn drives a shaft that turns the rotor in an electrical generator. The role of the gearbox is to couple the low-speed but high-torque drive shaft of the wind turbine rotor with the high-speed and low-torque generator rotor.

The majority of geared drive trains in existing wind turbines of ratings >1 MW utilize multiple gear stages to achieve gear ratios ranging from about 1:70 up to about 1:110. Usually, the gearbox comprises the three following stages: a simple planetary or epicyclic first stage, followed by two parallel offset stages, comprising a bull gear and pinion gears, or a second simple planetary stage followed by a parallel offset stage. The high gear ratio enables a generator that is substantially smaller and lower cost than the gearbox. Hence, the output shaft of the gearbox is a high-speed shaft.

It is desirable to keep the parallel stages of a wind turbine gearbox in a good alignment for a correct engagement of the gears in the gear mesh so as to withstand gear forces and moments in all directions and to be able to dismantle the components easily in the field. In embodiments, a good alignment is desirable between the intermediate and high-speeds shafts, which endure higher temperatures and thermal expansion.

Gearboxes are expensive, heavy and often difficult to maintain and repair over a 20 year lifetime.

A more optimal configuration of a geared drive train is therefore desirable by the wind industry to provide increased reliability and availability, reduced cost, reduced mass and size, easier maintenance and increased efficiency.

A known solution to the above challenge is to use two or three bearings located at each side of the gears. The most widespread solution in this category, is based on using two tapered roller bearings with "X" configuration also known as face-to-face configuration, on one side and one cylindrical bearing on the opposite side. However, this known solution has the drawback that it needs a lot of axial space in the gearbox housing, uses 3 relative expensive bearings and additionally enough axial space has to be provided to dismantle the high-speed shaft and the inner bearings.

Another known solution is the use of one tapered roller bearing on one end of the shaft, and another tapered roller bearing at the opposite end of the shaft, both arranged in "O" configuration, also known as back to back configuration. However, in this solution it is necessary to provide a split housing for the bearings where a heavy cover has to be dismantled in order to get access to the bearings.

The current development of the technology of wind turbines tends to an increased size of wind turbines for harvesting more wind energy, with longer blades and higher towers. As more energy is produced, the size and weight of the drive train components, i.e. the gearbox, the generator or the power electronics, and the components connected to the drive train components have increased in size as well.

SUMMARY

An aspect relates to a simple transmission assembly which efficiently transfers the torque and requires less components than the transmission assemblies or gearboxes in general known in the conventional art, which results in a reduced weight and a reduced manufacturing cost.

According to embodiments of the invention, a transmission assembly for coupling a forerunning gearbox stage to a generator of a wind turbine is divided into an input side and an output side and comprises an intermediate speed shaft, a high-speed shaft, and a gear mesh.

The intermediate speed shaft is supported by an intermediate speed shaft bearing arrangement and comprises an intermediate speed shaft gear.

The intermediate speed shaft is configured to rotate about an intermediate speed rotational axis.

The high-speed speed shaft is supported by a high-speed shaft bearing arrangement and comprises a high-speed shaft gear.

The high-speed shaft is configured to rotate about a high-speed rotational axis.

The high-speed shaft is configured to rotate faster than the intermediate speed shaft, as the role of the transmission assembly is to couple the low-speed but high-torque intermediate speed shaft with the high-speed and low-torque generator rotor.

The gear mesh is formed by an engagement of the intermediate speed shaft gear and the high-speed shaft gear, wherein the gear mesh is configured to transfer a torque between the intermediate speed shaft and the high-speed shaft.

A separation plane arranged at the gear mesh perpendicular to the intermediate speed rotational axis and the high-speed rotational axis separates the two sides of the transmission assembly into an input side and an output side. The input side is the side of the transmission assembly where torque enters the transmission assembly, and therefore the side where the shaft of the transmission assembly receives the torque from an external component. The output side is the side of the transmission assembly where torque exits the transmission assembly, and therefore the side where the shaft of the transmission assembly transmits the torque to an external component.

Hence, the expression "divided into an input side and an output side" means that a separation plane arranged at the gear mesh perpendicular to the intermediate speed rotational axis and the high-speed rotational axis separates the input side from the output side of the transmission assembly.

According to embodiments of the invention, both the intermediate speed shaft and the high-speed shaft comprise each a coupling end. The coupling end of the intermediate speed shaft is arranged at the input side and is configured to be coupled to an output of the forerunning gearbox stage. The coupling end of the high-speed shaft is arranged at the output side and is configured to be coupled to an input of the generator. In embodiments, the coupling can be a direct or an indirect coupling.

According to embodiments of the invention, the high-speed shaft gear and/or the intermediate speed shaft gear are supported by the respective bearings in a cantilever manner.

Supported in a cantilever manner means that the bearing arrangement is arranged only on one side of the gear and the gear is in radial direction unsupported on the other side. In embodiments, the bearing arrangement is arranged either on the input side of the transmission assembly or on the output side of the transmission assembly for the respective shaft, but the shaft is not supported on both the input side and the output side by the bearing arrangement.

In other words, cantilever manner means that the shaft is only supported by a bearing arrangement which is situated either on the input side or on the output side of the respective shaft.

By arranging the bearing arrangement only on one side of the shaft gear, enough support is provided for each the high-speed shaft and the intermediate speed shaft while reducing the number of bearings used in the transmission assembly, thereby reducing space requirements and having an economical solution which efficiently transfers torques. In addition, the shafts are at least partially loaded by the couplings at each coupling end between the input of the transmission assembly and a torque transferring component, such as a forerunning gearbox stage like a planetary gearbox stage, which transfers the torque to the transmission assembly or between the output of the transmission assembly and a torque receiving component, such as the generator, which receives the torque from the transmission assembly. In special arrangements, a coupling might be designed in a way that the shaft is partially supported by the coupling.

The shafts are also loaded by the gear mesh. However, the shafts are only supported on one side between the shaft gear and the end of the shaft.

Even if this cantilever support requires a slightly stiffer design of the shaft and bearing support, this configuration results in total in a reduced weight and reduced manufacturing cost, in particular by shortening the shafts of the parallel stages and by avoiding the need for heavy detachable housing for the bearings.

The coupling between the coupling end of the high-speed shaft and the input shaft of the generator can be a direct or an indirect coupling. Similarly, the coupling between the coupling end of the intermediate speed shaft and the forerunning gearbox stage can be a direct or an indirect coupling.

In embodiments, both the intermediate speed shaft and the high-speed shaft comprise each a radially supported shaft portion at which the respective bearing arrangement is arranged and a gear portion at which the respective shaft gear is arranged in such a way that the shafts are radially supported in a cantilever manner.

If the bearing arrangement is arranged at the opposite side from where the coupling end of the shaft is located, then the shaft comprises a free end, which is a part of the shaft axially extending from the gear towards the opposite side of the coupling end and which is not configured to be coupled to any other component or to transmit the torque to any other component. The free ends of both the intermediate speed shaft and the high-speed shaft are ends of the shafts which do not transfer the torque and are not in the pathway of the torque being transmitted from the coupling end of the intermediate speed shaft to the coupling end of the high-speed shaft. The shaft is then supported at the free end by the bearing arrangement and the portion of the shaft between the gear portion and the coupling end of the shaft is radially unsupported.

In an embodiment, the coupling is a direct coupling, what means that the generator input shaft runs with the same speed than the high-speed shaft. Embodiments of the invention are most beneficial if used for a shaft directly coupled to the generator input shaft, as often the axial space between gearbox and generator is very limited and the compact design of embodiments of the invention allows for reduced size and weight of drive train by still allowing easy maintenance in the limited available space.

According to embodiment of the invention, the high-speed shaft bearing arrangement is arranged at the opposite side of the intermediate speed shaft bearing arrangement relative to the separation plane. In other words, one of the high-speed shaft bearing or the intermediate shaft bearing is arranged on the input side and the other one is arranged on the output side. This arrangement is advantageous as it provides an optimal bearing support for the transmission assembly.

According to embodiment of the invention, the high-speed shaft bearing arrangement is arranged at the output side and the intermediate speed shaft bearing arrangement is arranged at the input side. This configuration is particularly advantageous to counteract deflections of the shaft originating from the rotation of the shaft, as the cantilever support acts against the deflections, thereby minimizing the radial distance between the gears of the gear mesh and allowing the shafts to stay substantially parallel during rotation.

According to embodiment of the invention, the high-speed shaft bearing arrangement is arranged at the input side and the intermediate speed shaft bearing arrangement is arranged at the output side. This is another alternative to counteract deflections of the shafts.

According to embodiment of the invention, the high-speed shaft bearing arrangement is arranged at the same side as the intermediate speed shaft bearing arrangement relative to the separation plane. In other words, both the high-speed shaft bearing and the intermediate shaft bearing are arranged either on the input side or on the output side. This configuration allows for a shorter transmission assembly, as the bearing arrangements can be arranged compactly with a radial distance from one another.

According to embodiment of the invention, both the high-speed shaft bearing arrangement and the intermediate speed shaft bearing arrangement are arranged at the output side. Both bearing arrangements can then be supported on the gearbox housing or on the generator housing.

According to embodiment of the invention, both the high-speed shaft bearing arrangement and the intermediate speed shaft bearing arrangement are arranged at the input side. Both bearing arrangements can then be supported on the gearbox housing.

According to embodiment of the invention, the radially supported shaft portion of the high-speed shaft is arranged only between the high-speed shaft gear and the coupling end of the high-speed shaft. This arrangement is advantageous as it provides best load transfer from the gear and the coupling end into the bearing support.

According to embodiment of the invention, the radially supported shaft portion of the high-speed shaft is arranged only between the high-speed shaft gear and the free end of the high-speed shaft. This arrangement has the advantage that the high-speed shaft can be easily dismounted by pulling it out in direction of the coupling end.

According to embodiment of the invention, the radially supported shaft portion of the intermediate speed shaft is arranged only between the intermediate speed shaft gear and the coupling end of the intermediate speed shaft. This arrangement again allows for best load transfer to the bearing support.

According to embodiment of the invention, the radially supported shaft portion of the intermediate speed shaft is arranged only between the intermediate speed shaft gear and the free end of the intermediate speed shaft.

This arrangement is advantageous for exchange of the intermediate shaft bearing in case of bearing damage.

According to embodiment of the invention, the high-speed shaft bearing arrangement and/or the intermediate speed shaft bearing arrangement comprise a pair of tapered roller bearings coaxially arranged to the respective shaft.

An advantage of the incorporation of at least one pair of tapered roller bearings is that the shaft can be shorter compared with conventional shafts, which implies weight and cost reduction of the transmission assembly.

Hence, the pair of tapered roller bearings are coaxially mounted either on the high-speed shaft, on the intermediate speed shaft or on both shafts.

According to embodiment of the invention, the pair of tapered roller bearings is arranged in an "X" or face-to-face configuration.

According to embodiment of the invention, the pair of tapered roller bearings is arranged in an "O" or back-to-back configuration. The "O" arrangement allows for best support of the shaft against misalignments.

The pair of tapered roller bearings can withstand loads and bending moments in any direction, and they can be set to the necessary endplay or preload to cope with temperatures. In embodiments, the two tapered roller bearings in back-to-back configuration, withstand axial forces equally in both axial directions, and are less sensitive to temperatures than the "X" configuration.

An additional advantage of the above-described bearing arrangement is that the position of the tapered roller bearings may be designed so that the shaft deflection of the high-speed shaft and the intermediate speed shaft, goes in the same direction, such that an optimum gear mesh alignment is realized.

By choosing a configuration of the arrangement of the bearings in a way that the rotational axis of the shaft gears stays substantially parallel even in deflected state, the radial distance between the gears will slightly increase but such a deformation is much better for the load distribution in the gear mesh than other bearing arrangements, where due to the small deflections in the shaft the gears will not stay substantially parallel. In these other configurations, there is less contact at the gear mesh and a less efficient load transfer between the axes.

According to embodiment of the invention, the tapered roller bearings are axially retained between a radial abutment of the shaft and a retention ring.

According to embodiment of the invention, the intermediate speed shaft bearing arrangement and/or the high-speed shaft bearing arrangement is supported on a housing.

The housing at which the intermediate speed shaft bearing arrangement is supported can be different from the housing at which the high-speed shaft bearing arrangement is supported. For example, the intermediate speed shaft bearing arrangement can be supported at the gearbox housing and the high-speed shaft bearing arrangement can be supported at the generator housing.

Alternatively, the housing at which the intermediate speed shaft bearing arrangement is supported can be the same as the housing at which the high-speed shaft bearing arrangement is supported. For example, both the intermediate speed shaft bearing arrangement and the high-speed shaft bearing arrangement can be supported at the gearbox housing.

Yet another aspect of embodiments of the invention relates to a gearbox for a wind turbine comprising a forerunning gearbox stage and a transmission assembly coupled to the output of the forerunning gearbox stage.

Such a gearbox has the advantages of an efficient gear mesh between the shafts of parallel stages, and that is less sensitive to temperatures.

According to embodiment of the invention, the housing is a gearbox housing.

Yet another aspect of embodiments of the invention relates to a drive train of a wind turbine comprising a main bearing unit, a main shaft coupled to an output of the main bearing unit, a transmission assembly coupled to the main shaft and a generator coupled to an output of the transmission assembly.

Yet another aspect of embodiments of the invention relates to a drive train of a wind turbine comprising a main bearing unit, a main shaft coupled to an output of the main bearing unit, a gearbox coupled to the main shaft and a generator coupled to an output of the gearbox, wherein the transmission assembly is arranged between the forerunning gearbox stage and the generator.

Yet another aspect of embodiments of the invention relates to a wind turbine comprising a drive train.

In the present disclosure, the terms axial, axially or coaxially refer to the direction of the rotation axis of a shaft, such as the high-speed shaft or the intermediate speed shaft, or a direction parallel to that rotation axis.

BRIEF DESCRIPTION

Some of the embodiments will be described in detail, with references to the following Figures, wherein like designations denote like members, wherein:

FIG. 8 shows schematic drawings of transmission assemblies in the configuration shown in FIGS. 3 to 6 respectively;

DETAILED DESCRIPTION

Figure 1:
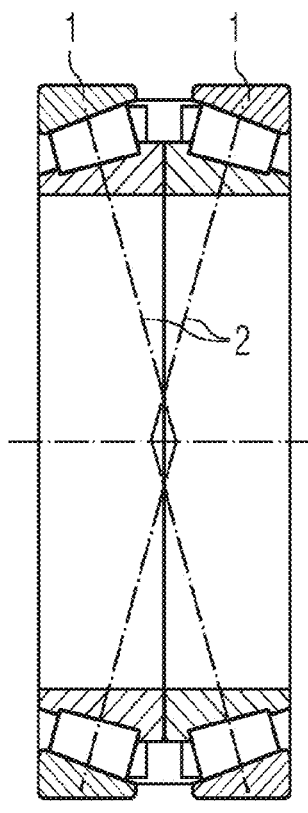
FIG. 1 shows a pair of tapered roller bearing in "X" and in "O" configuration, respectively.

FIG. 1 shows a cross-sectional view of the topology of a double tapered roller bearing (1) in a "X" or face-to-face configuration. As shown in the figure, each tapered roller bearing (1) has a plurality of tapered rollers arranged relative to the rollers of the other tapered roller bearing (1), such that load reaction lines (2) of the rollers converge towards the axis (v) of the bearing, in a way that these load reaction lines (2) configure an "X" shape, or it could be said that the rollers of one tapered roller bearing (1) face the rollers of the other tapered roller bearing (1). Each roller has a rotation axis, and the respective load reaction line (2) of each roller, is generally orthogonal to its rotation axis.

Figure 2:
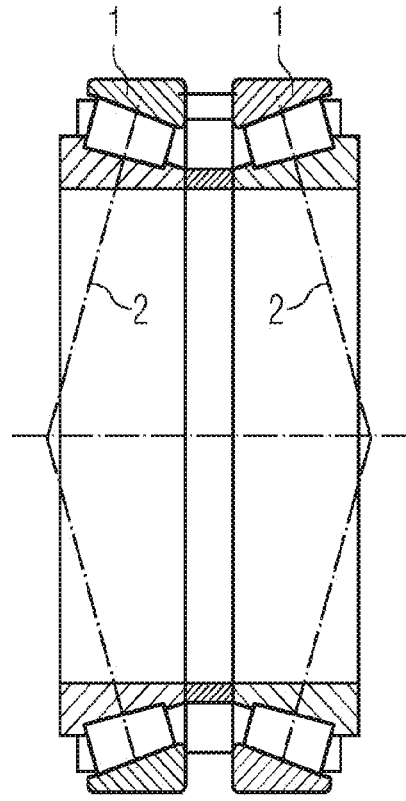
FIG. 2 shows a pair of tapered roller bearing in "X" and in "O" configuration, respectively.

FIG. 2 shows a cross-sectional view of the topology of a double tapered roller bearing (1) in an "O" or back-to-back configuration. As shown in the figure, each tapered roller bearing (1) has a plurality of tapered rollers arranged relative to the rollers of the other tapered roller bearing (1), such that load reaction lines (2) of the rollers diverge towards the axis (y) of the bearing, in a way that these load reaction lines (2) configure an "O" shape, or it could be said that the rollers of one tapered roller bearing (1) back the rollers of the other tapered roller bearing (1).

FIGS. 3 to 6 show a gearbox (18) of a wind turbine (14) in different configurations. The gearbox (18) comprises a forerunning gearbox stage (19) followed by a transmission assembly (3) comprising a parallel offset stage. Both the forerunning gearbox stage (19) and the transmission assembly (3) are supported by bearings arranged between the housing (11) of the gearbox (18) and the respective shaft.

The transmission assembly (3) is configured to couple the forerunning gearbox stage (19) to a generator (16) of the wind turbine (14).

The transmission assembly (3) comprises an intermediate speed shaft (5) comprising an intermediate speed shaft gear (25) coupled to an output of the forerunning gearbox stage (19), a high-speed shaft (4) comprising a high-speed shaft gear (24) and being configured to be coupled to an input of the generator (16), wherein the high-speed shaft (4) is configured to rotate faster than the intermediate speed shaft (5), and a gear mesh (6) formed by an engagement of the intermediate speed shaft gear (25) and the high-speed shaft gear (24), wherein the gear mesh (6) is configured to transfer a torque between the intermediate speed shaft (5) and the high-speed shaft (4).

The transmission assembly (3) is divided into two sides by the separation plane (30), which are the input side (20) coupled to an output of the forerunning gearbox stage (19) and the output side (21) configured to be coupled to an input of the generator (16).

The expression "divided in two sides by the separation plane" means that a separation plane (30) arranged at the gear mesh (6) perpendicular to the intermediate speed rotational axis (29) and the high-speed rotational axis (28) separates the input side from the output side (20, 21) of the transmission assembly.

The intermediate speed shaft (5) is supported on the housing (11) only by an intermediate speed shaft bearing arrangement (23) arranged between the housing (11) and the intermediate speed shaft (5) and the high-speed shaft (4) is supported on the housing (11) only by a high-speed shaft bearing arrangement (22) arranged between the housing (11) and the high-speed shaft (4).

Each of the intermediate speed shaft (5) and the high-speed shaft (4) comprise a coupling end (26) and a free end (27), wherein the coupling end (26) and the free end (27) are separated by the shaft gear (24, 25).

The coupling end (26) of the intermediate speed shaft (5) is coupled to the output of the forerunning gearbox stage (19). The coupling end (26) of the high-speed shaft (4) is configured to be coupled to the input of the generator (16) of the wind turbine (14).

Both the intermediate speed shaft (5) and the high-speed shaft (4) comprise each a radially supported shaft portion at which the respective bearing arrangement (22, 23) is arranged and a gear portion at which the respective shaft gear (24, 25) is arranged in such a way that the shafts (4, 5) are radially supported in a cantilever manner.

Figure 3:
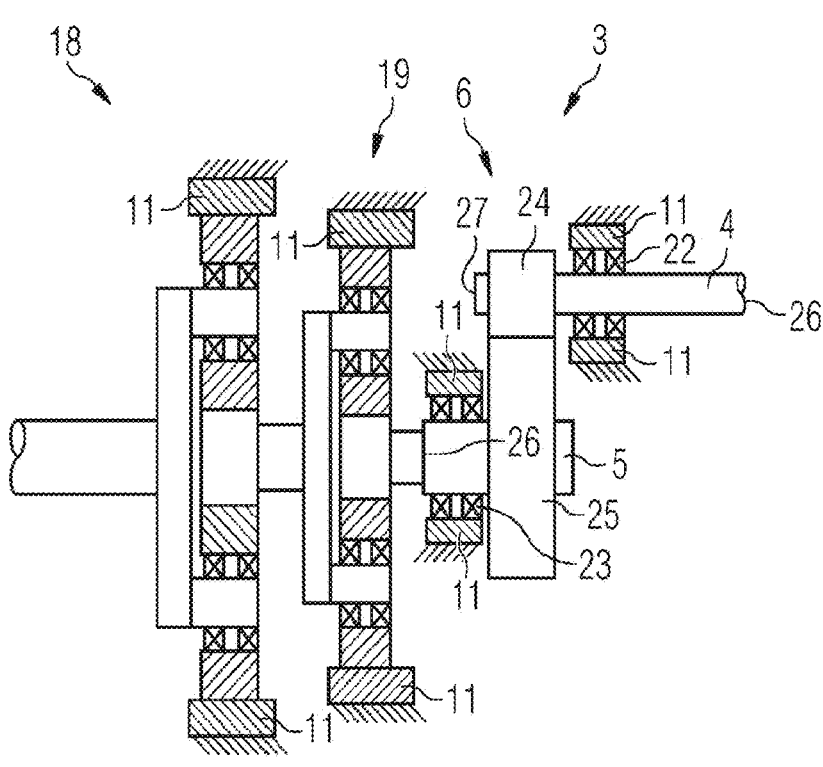
FIG. 3 shows a gearbox of a wind turbine in different configurations.

In FIG. 3, the high-speed shaft bearing arrangement (22) at the radially supported shaft portion is arranged only between the high-speed shaft gear (24) and the coupling end (26) of the high-speed shaft (4) and the intermediate speed shaft bearing arrangement (23) at the radially supported shaft portion is arranged only between the intermediate speed shaft gear (25) and the coupling end (26) of the intermediate speed shaft (5).

Figure 4:
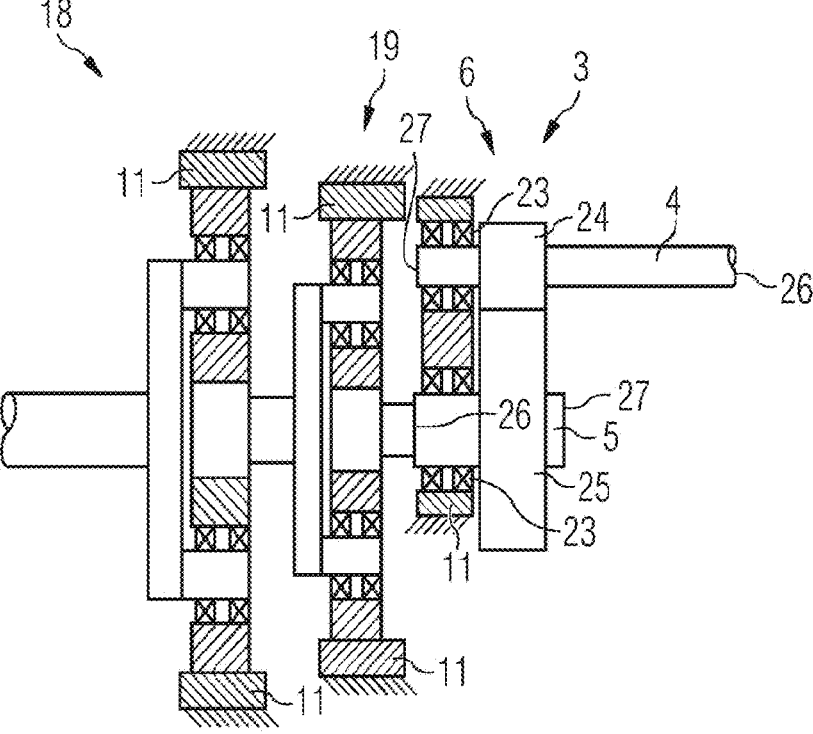
FIG. 4 shows a gearbox of a wind turbine in different configurations.

In FIG. 4, the high-speed shaft bearing arrangement (22) at the radially supported shaft portion is arranged only between the high-speed shaft gear (24) and the free end (27) of the high-speed shaft (4) and the intermediate speed shaft bearing arrangement (23) at the radially supported shaft portion is arranged only between the intermediate speed shaft gear (25) and the coupling end (26) of the intermediate speed shaft (5). Thus, the high-speed shaft bearing arrangement (22) and the intermediate speed shaft bearing arrangement (23) are arranged at the same side of the separation plane (30) radially separated and at least partially axially overlapping, that means both bearings (22, 23) are arranged on the input side (20) of the transmission assembly (3).

Figure 5:
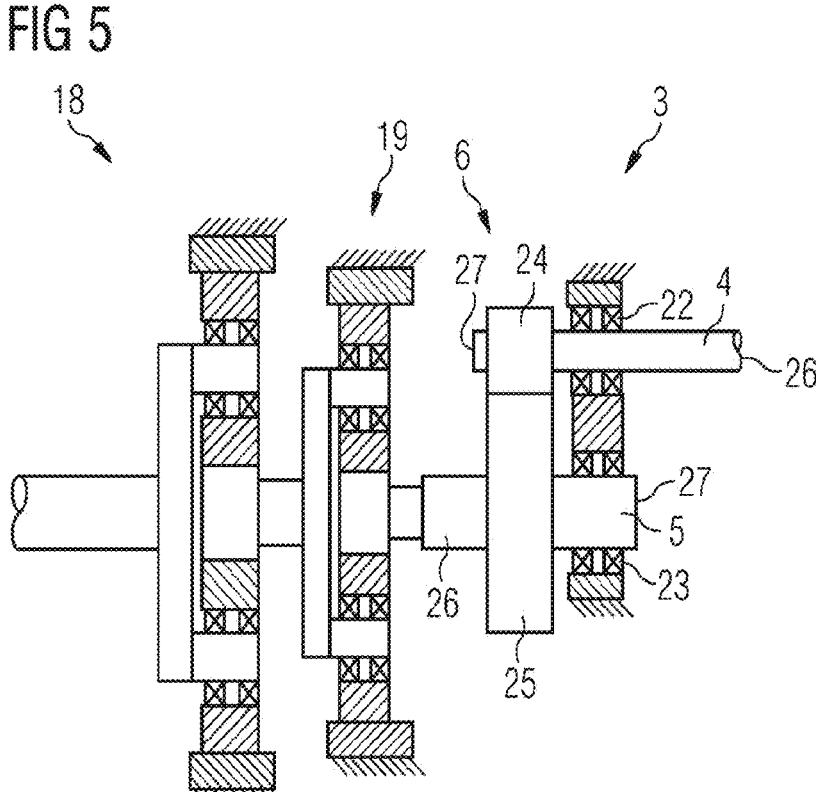
FIG. 5 shows a gearbox of a wind turbine in different configurations.

In FIG. 5, the high-speed shaft bearing arrangement (22) at the radially supported shaft portion is arranged only between the high-speed shaft gear (24) and the coupling end (26) of the high-speed shaft (4) and the intermediate speed shaft bearing arrangement (23) at the radially supported shaft portion is arranged only between the intermediate speed shaft gear (25) and the free end (27) of the intermediate speed shaft (5). Thus, the high-speed shaft bearing arrangement (22) and the intermediate speed shaft bearing arrangement (23) are arranged at the same side of the separation plane (30) radially separated and at least partially axially overlapping, that means both bearings (22, 23) are arranged on the output side (21) of the transmission assembly (3).

Figure 6:
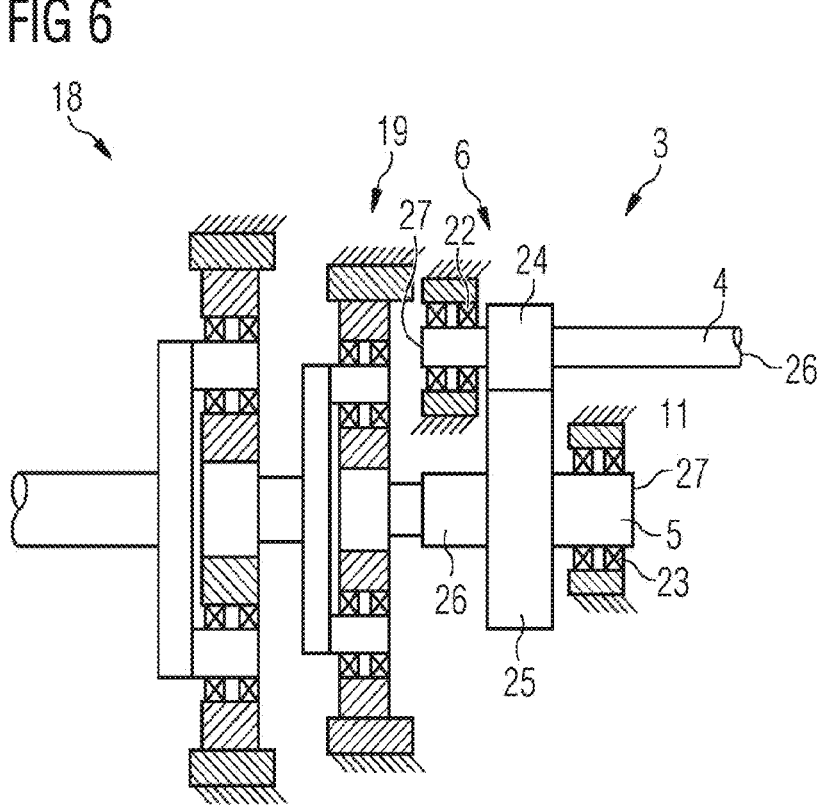
FIG. 6 shows a gearbox of a wind turbine in different configurations.

In FIG. 6, the high-speed shaft bearing arrangement (22) at the radially supported shaft portion is arranged only between the high-speed shaft gear (24) and the free end (27) of the high-speed shaft (4) and the intermediate speed shaft bearing arrangement (23) at the radially supported shaft portion is arranged only between the intermediate speed shaft gear (25) and the free end (27) of the intermediate speed shaft (5).

Figure 7:
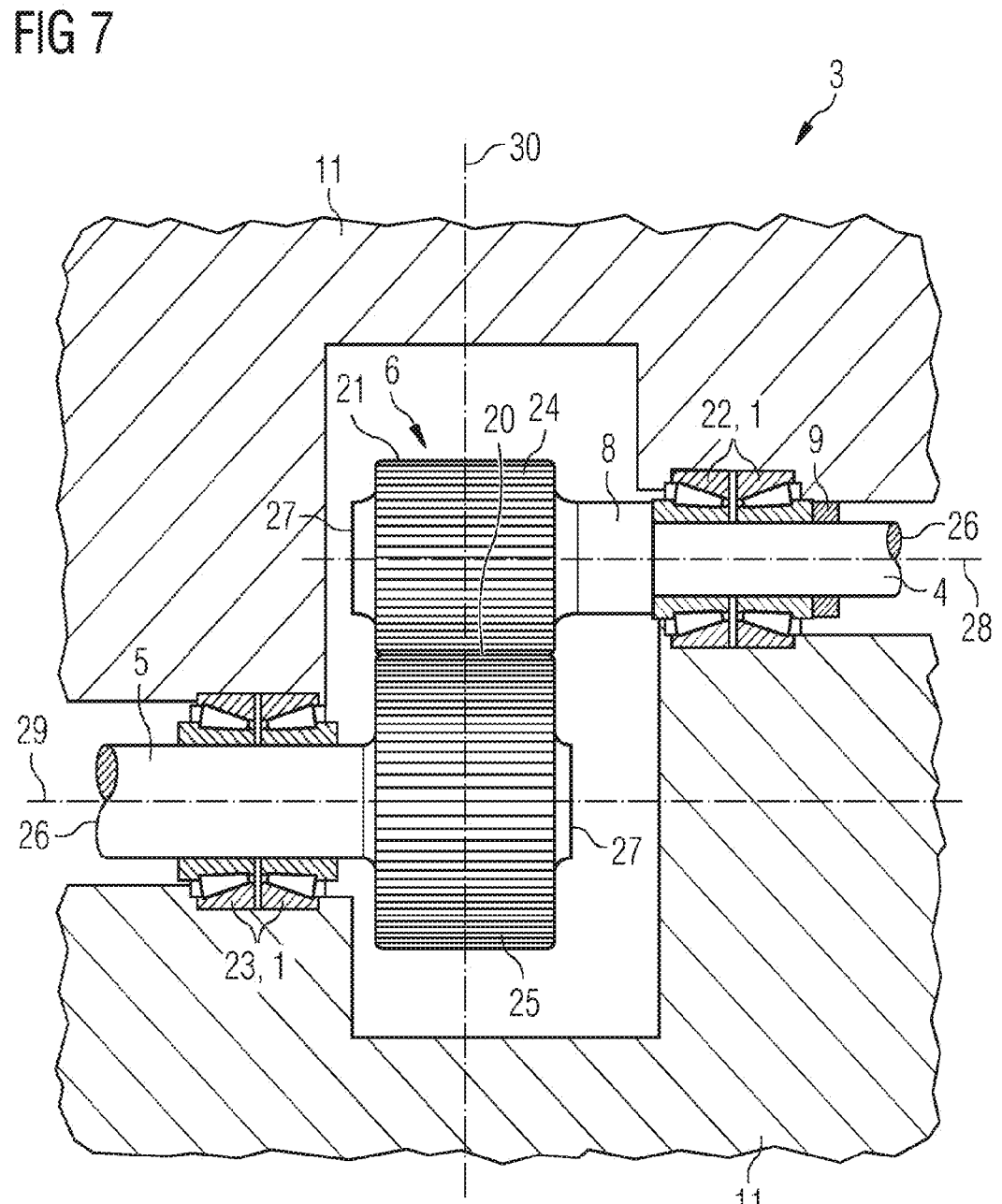
FIG. 7 shows schematic drawings of transmission assemblies in the configuration shown in FIGS. 3 to 6 respectively.
Figure 8:
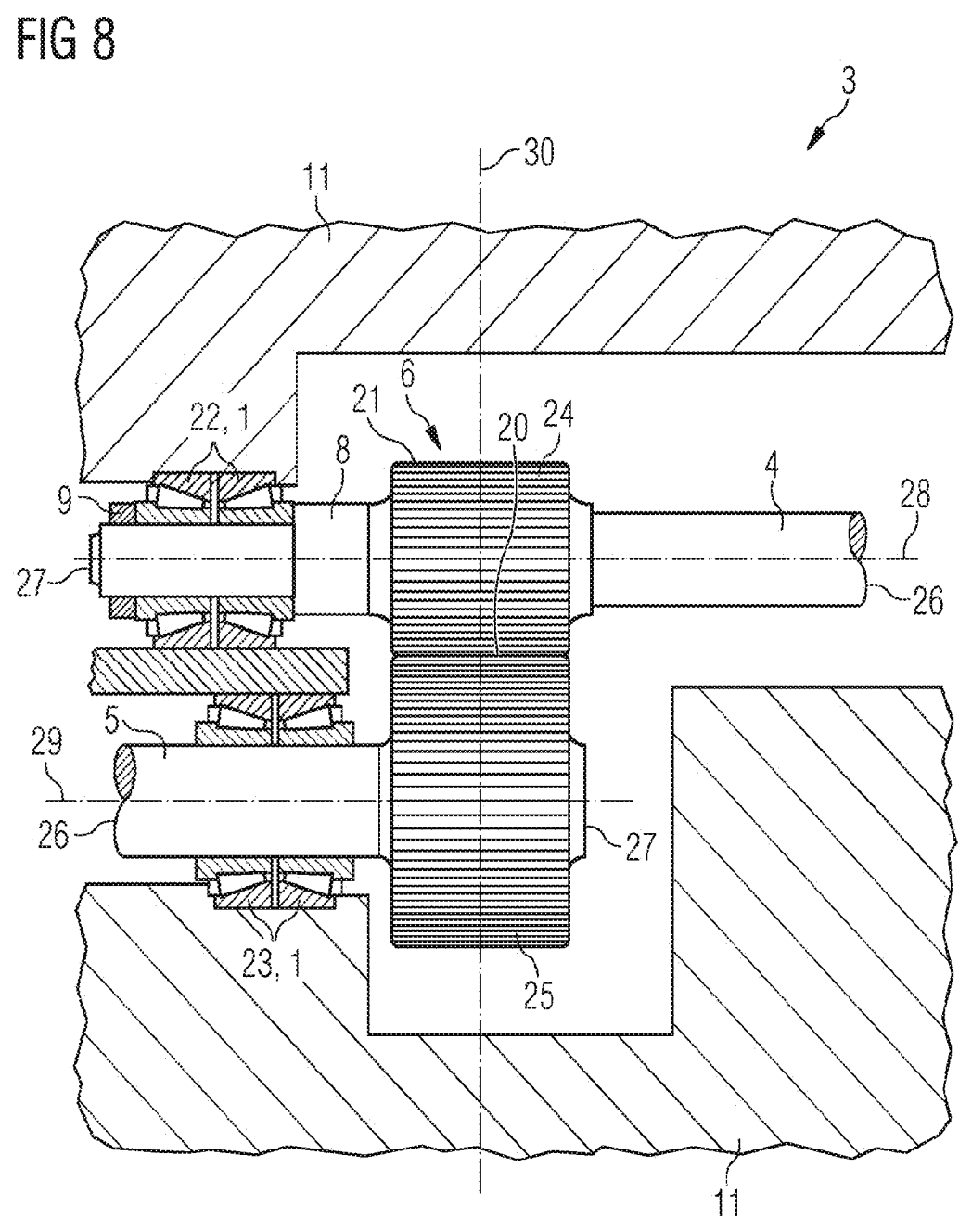
Figure 9:
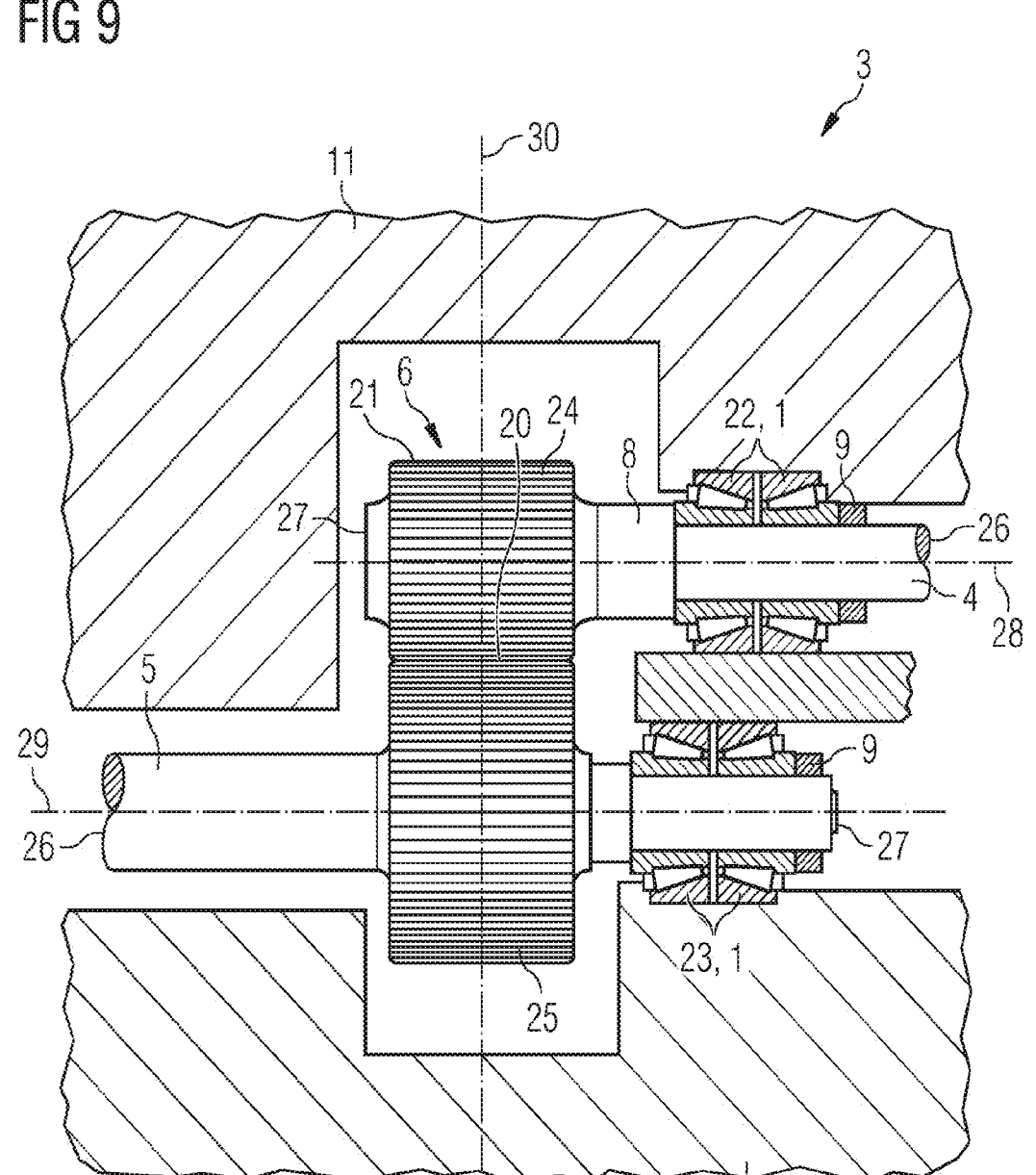
FIG. 9 shows schematic drawings of transmission assemblies in the configuration shown in FIGS. 3 to 6 respectively.

FIGS. 7 to 10 show schematic drawings of transmission assemblies (3) in the configuration shown in FIGS. 3 to 6 respectively. The high-speed shaft bearing arrangement (22) and the intermediate speed shaft bearing arrangement (23) of each transmission assembly (3) comprises a pair of tapered roller bearings (1) in "O" or back-to-back configuration. The pair of tapered roller bearings (1) of the high-speed shaft bearing arrangement (22) is axially retained at the high-speed shaft (4) between a radial abutment (8) of the shaft (4) and a retention ring (9) for each figure. FIGS. 7, 8 and 9 show the pair of tapered roller bearings (1) of the high-speed shaft bearing arrangement (22) axially retained at the high-speed shaft (4) between a radial abutment (8) of the shaft (4) and a retention ring (9). In addition, FIGS. 9 and 10 also show the pair of tapered roller bearings (1) of the intermediate speed shaft bearing arrangement (23) axially retained at the intermediate speed shaft (5) between a radial abutment (8) of the shaft (5) and a retention ring (9).

The transmission assembly (3) of FIGS. 7 to 10 is divided into two sides by the separation plane (30), which are the input side (20) configured to be coupled to an output of the forerunning gearbox stage (19) and the output side (21) configured to be coupled to an input of the generator (16). As seen in the figures, the before-mentioned separation plane (30) is arranged at the gear mesh (6) perpendicular to the intermediate speed rotational axis (29) and the high-speed rotational axis (28) and separates the two sides (20, 21) of the transmission assembly (3).

Both the intermediate speed shaft (5) and the high-speed shaft (4) comprise each a radially supported shaft portion at which the respective bearing arrangement (22, 23) is arranged and a gear portion at which the respective shaft gear (24, 25) is arranged in such a way that the shafts (4, 5) are radially supported in a cantilever manner.

The configuration shown in FIG. 7 is particularly advantageous. By having this configuration, the shaft deflection is considerably reduced, and the load line is transmitted through the complete length of the shaft gears (24, 25). Due to the torque transmission, the intermediate speed shaft (5) is deflected at its free end (27) away from the high-speed shaft (4) and this deflection is blocked by the intermediate speed shaft bearing arrangement (23) being arranged at the opposite side of the free end (27) of the intermediate speed shaft (5). Similarly, the high-speed shaft (4) is deflected at its free end (27) away from the intermediate speed shaft (5) and this deflection is blocked by the high-speed shaft bearing arrangement (22) being arranged at the opposite side of the free end (27) of the high-speed shaft (4). The result of these small deflections is that the high-speed rotational axis (28) and the intermediate speed rotational axis (29) stay substantially parallel even in deflected state, but the radial distance between the gears (24, 25) will slightly increase. Nevertheless, such a deformation is much better for the load distribution in the gear mesh than in the configurations of FIGS. 8 and 9, where due to the (small) deflections in the shaft, the gears (24, 25) will not stay substantially parallel.

Figure 10:
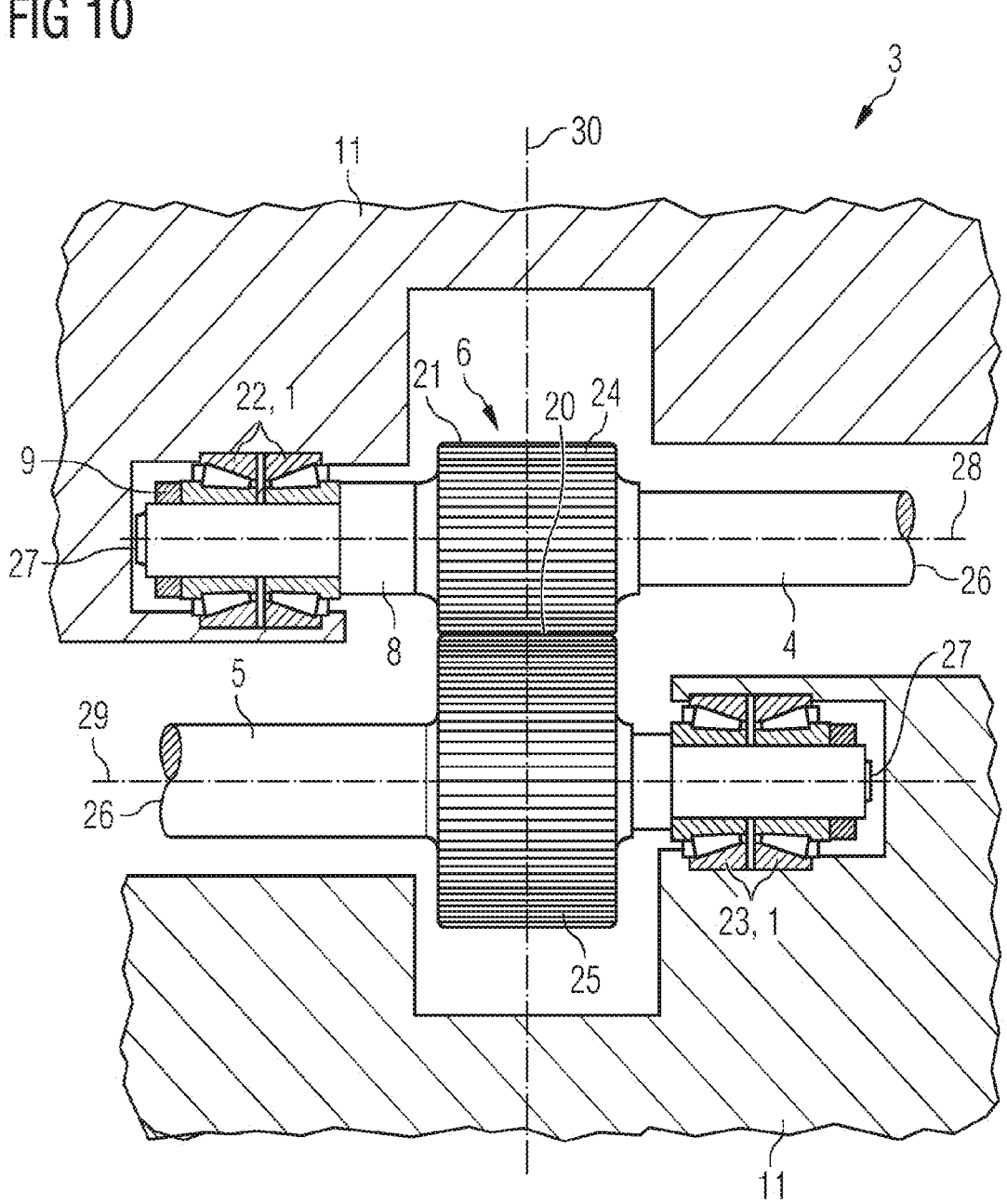
FIG. 10 shows schematic drawings of transmission assemblies in the configuration shown in FIGS. 3 to 6 respectively.

In the configuration of FIG. 10, the shaft deflections will behave in the same manner as described for FIG. 7, but as the bearings are arranged on both shafts near the free end of the shafts, the overall deformations might be slightly larger than in the configuration of FIG. 7.

Figure 11:
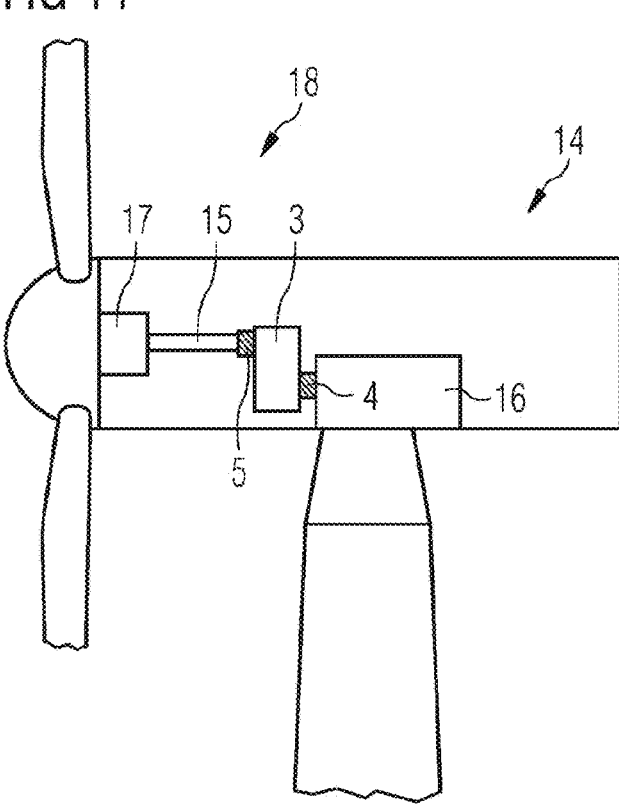
FIG. 11 shows a wind turbine with different configurations of the drive train.
Figure 12:
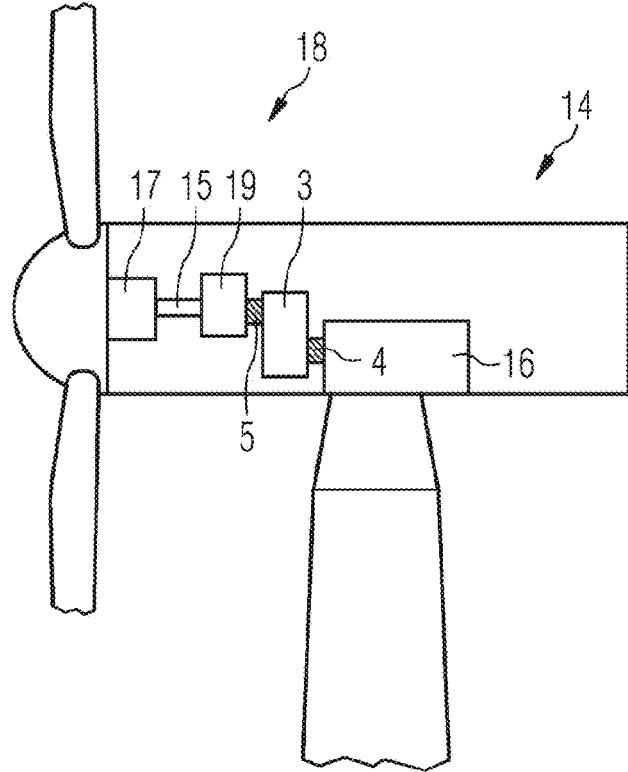
FIG. 12 shows a wind turbine with different configurations of the drive train.

FIGS. 11 and 12 show a wind turbine (14) with different configurations of the drive train. The drive train comprises a main bearing unit (17) supporting the main shaft (15)

coupled to the rotor of the wind turbine (14) and a generator (16) for generating electric power.

In FIG. 11, the main shaft (15) is directly coupled to the intermediate speed shaft (5) of the transmission assembly (3) and the high-speed shaft (4) is directly coupled to the generator (16).

In FIG. 12, the main shaft (15) is coupled to a forerunning gearbox stage (19). The output of the forerunning gearbox stage (19) is coupled to the intermediate speed shaft (5) of the transmission assembly (3) and the high-speed shaft (4) is directly coupled to the generator (16). Both the forerunning gearbox stage (19) and the transmission assembly (3) form the gearbox (18) of the drive train.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

REFERENCE NUMBERS 1 tapered roller bearing
2 load reaction line
3 transmission assembly
4 high-speed shaft
5 intermediate speed shaft
6 gear mesh
8 radial abutment
9 retention ring
11 housing
12 gearbox housing
13 generator housing
14 wind turbine
15 main shaft
16 generator
17 main bearing unit
18 gearbox
19 forerunning gearbox stage
20 input side
21 output side
22 high-speed shaft bearing arrangement
23 intermediate speed shaft bearing arrangement
24 high-speed shaft gear
25 intermediate speed shaft gear
26 coupling end
27 free end
28 high-speed rotational axis
29 intermediate speed rotational axis
30 separation plane

The invention claimed is:

1. A transmission assembly for coupling a forerunning gearbox stage to a generator of a wind turbine, the transmission assembly being divided into an input side and an output side, the transmission assembly comprising:

an intermediate speed shaft supported by an intermediate speed shaft bearing arrangement and configured to rotate about an intermediate speed rotational axis, wherein the intermediate speed shaft comprises an intermediate speed shaft gear, a high-speed shaft supported by a high-speed shaft bearing arrangement and configured to rotate about a high-speed rotational axis, wherein the high-speed shaft comprises a high-speed shaft gear and is configured to rotate faster than the intermediate speed shaft, wherein the intermediate speed rotational axis and the high-speed rotational axis are arranged in parallel; and a gear mesh formed by an engagement of the intermediate speed shaft gear and the high-speed shaft gear, wherein a separation plane arranged at the gear mesh perpendicular to the intermediate speed rotational axis and the high-speed rotational axis separates the two sides of the transmission assembly, wherein both the intermediate speed shaft and the high-speed shaft each comprise a coupling end;

wherein the coupling end of the intermediate speed shaft is arranged at the input side and is configured to be coupled to an output of the forerunning gearbox stage, wherein the coupling end of the high-speed shaft is arranged at the output side and is configured to be coupled to the generator, wherein the high-speed shaft gear and/or the intermediate speed shaft gear are supported by the respective bearing arrangement in a cantilever manner;

wherein one of the high-speed shaft bearing arrangement or the intermediate shaft bearing arrangement is arranged on the input side and the other one is arranged on the output side.

2. The transmission assembly according to claim 1, wherein the high-speed shaft bearing arrangement is arranged at the output side and the intermediate speed shaft bearing arrangement is arranged at the input side.

3. The transmission assembly according to claim 1, wherein the high-speed shaft bearing arrangement is arranged at the input side and the intermediate speed shaft bearing arrangement is arranged at the output side.

4. The transmission assembly according to claim 1, wherein the high-speed shaft bearing arrangement and/or the intermediate speed shaft bearing arrangement comprise a pair of tapered roller bearings coaxially arranged to the respective shaft.

5. The transmission assembly according to claim 4, wherein the pair of tapered roller bearings is arranged in an X configuration or in an O configuration.

6. The transmission assembly according to claim 4, wherein the pair of tapered roller bearings is axially retained between a radial abutment of the high-speed shaft and a retention ring.

7. The transmission assembly according to claim 1, wherein the intermediate speed shaft bearing arrangement and/or the high-speed shaft bearing arrangement is supported on a housing.

8. A gearbox for a wind turbine comprising a forerunning gearbox stage and a transmission assembly according to claim 1 coupled to the output of the forerunning gearbox stage.

9. A drive train of a wind turbine comprising a main bearing unit, a main shaft coupled to an output of the main bearing unit, a transmission assembly according to claim 1 coupled to the main shaft and a generator coupled to an output of the transmission assembly.

10. A drive train of a wind turbine comprising a main bearing unit, a main shaft coupled to an output of the main bearing unit, a gearbox according to claim 8 coupled to the main shaft and a generator coupled to an output of the gearbox, wherein the transmission assembly is arranged between the forerunning gearbox stage and the generator.

11. A wind turbine comprising a drive train according to claim 9.

12. A wind turbine comprising a drive train according to claim 10.

13. A transmission assembly for coupling a forerunning gearbox stage to a generator of a wind turbine, the transmission assembly being divided into an input side and an output side, the transmission assembly comprising:

an intermediate speed shaft supported by an intermediate speed shaft bearing arrangement and configured to rotate about an intermediate speed rotational axis, wherein the intermediate speed shaft comprises an intermediate speed shaft gear, a high-speed shaft supported by a high-speed shaft bearing arrangement and configured to rotate about a high-speed rotational axis, wherein the high-speed shaft comprises a high-speed shaft gear and is configured to rotate faster than the intermediate speed shaft, wherein the intermediate speed rotational axis and the high-speed rotational axis are arranged in parallel; and a gear mesh formed by an engagement of the intermediate speed shaft gear and the high-speed shaft gear, wherein a separation plane arranged at the gear mesh perpendicular to the intermediate speed rotational axis and the high-speed rotational axis separates the two sides of the transmission assembly, wherein both the intermediate speed shaft and the high-speed shaft each comprise a coupling end;

wherein the coupling end of the intermediate speed shaft is arranged at the input side and is configured to be coupled to an output of the forerunning gearbox stage, wherein the coupling end of the high-speed shaft is arranged at the output side and is configured to be coupled to the generator, wherein the high-speed shaft gear and/or the intermediate speed shaft gear are supported by the respective bearing arrangement in a cantilever manner;

wherein both the high-speed shaft bearing arrangement and the intermediate speed shaft bearing arrangement are arranged at the input side.

* * * * *